(12) United States Patent
Loy et al.

(10) Patent No.: US 6,235,864 B1
(45) Date of Patent: May 22, 2001

(54) NON-STRINKING SILOXANE POLYMERS

(75) Inventors: Douglas A. Loy; Kamyar Rahimian, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/310,632

(22) Filed: May 12, 1999

(51) Int. Cl.$^7$ .................................................. C08G 77/04
(52) U.S. Cl. ........................... 528/35; 528/37; 556/434; 556/435; 549/214
(58) Field of Search .................. 556/434, 435; 549/214; 528/35, 37

(56) References Cited

U.S. PATENT DOCUMENTS

| | | | | |
|---|---|---|---|---|
| 3,041,362 | * | 6/1962 | Merker ..................................... | 528/35 |
| 3,317,456 | * | 5/1967 | Hansen ..................................... | 528/35 |
| 3,338,951 | * | 8/1967 | Knaub ..................................... | 528/35 |
| 3,387,015 | * | 6/1968 | Piccoli ..................................... | 528/35 |
| 3,660,449 | * | 5/1972 | Schaschel ........................ | 260/448.2 D |
| 5,120,811 | | 6/1992 | Glotfelter et al. ..................... | 528/25 |
| 5,272,240 | | 12/1993 | Haruvy et al. ......................... | 528/10 |

OTHER PUBLICATIONS

Phenylene–Bridged Cyclic Siloxanes as Precursors to Non-shrinking Sol–Gel Systems . . . Loy et al., Agnew. Chem. Int. Ed., 1999.*
Suryanarayanan, B., Peace, B. and Mayhan, K., "Anionic Polymerization of 2,2,5,5–Tetramethyl–l–oxa–2,5–disilacyclopentane," J. Polymer Sci., 1974, 12, 1089–1107.
Samara, M. and Loy, D., "Shrinkage and Recyclability of Poly(1,2–ethylene–bis(dimethylsiloxane))," Polym. Preprints, 1998, 39(1), 599.
Rahimian, K. and Loy, D., "Non–shrinking Sol–gel Type Polymers by Ring Opening Polymerization," Polymer Preprints, 217th National Meeting of the American Chemical Society, Anaheim, CA, Mar. 21–25, 1999.
Rahimian, K. and Loy, D., "Arylene–Bridged 2,2,5,5–Tetramenthyl–2,5–Disila–l–Oxacyclopentanes as Precursors to Non–Shrinking Polysiloxanes. A New Route to Sol–Gel Type Polymers," Polymer Preprints, 216th National Meeting of the American Chemical Society, Boston, Mass, Aug. 23–27, 1998.
Loy, D., Rahimian, K. and Samara, M., "Phenylene–Bridged Cyclic Siloxanes as Precursors to Non–Shrinking Sol–gel Systems and Their Use as Encapsulants," Angew. Chem. Int. Ed., 1999, 38(4), 555–557.
Watanabe, H., Kobayashi, M, Saito, M. and Nagai, Y., "Reaction of Disilanes with Acetylenes II. Double Silylation of 1–Hexyne, Trimethylsilylacetylene and Acetylene with Methoxymethyldisilanes Catalyzed by Tetrakis(Triphenylphosphine)Palladium, " J. of Organometallic Chemistry, 1981, 216, 149–157.
Sadhir, R. and Luck, R. (eds.), Expanding Monomers: Synthesis, Characterization, and Applications, 1992, CRC Press, Boca Raton, FL, 21–37.

* cited by examiner

Primary Examiner—Margaret G. Moore
(74) Attorney, Agent, or Firm—Elmer A. Klavetter

(57) ABSTRACT

Cross-linked polymers formed by ring-opening polymerization of a precursor monomer of the general formula $R[CH_2CH(Si(CH_3)_2)_2O]_2$, where R is a phenyl group or an alkyl group having at least two carbon atoms. A cross-linked polymer is synthesized by mixing the monomer with a co-monomer of the general formula $CH_2CHR^2(SiMe_2)_2O$ in the presence of an anionic base to form a cross-linked polymer of recurring units of the general formula $R(Me_2SiOCH_2CHSiMe_2)_2[CH_2CHR^2(SiMe_2)_2O]_n$, where $R^2$ is hydrogen, phenyl, ethyl, propyl or butyl. If the precursor monomer is a liquid, the polymer can be directly synthesized in the presence of an anionic base to a cross-linked polymer containing recurring units of the general formula $R(Me_2SiOCH_2CHSiMe_2)_2$. The polymers have approximately less than 1% porosity and are thermally stable at temperatures up to approximately 500° C. The conversion to the cross-linked polymer occurs by ring opening polymerization and results in shrinkage of less than approximately 5% by volume.

18 Claims, 4 Drawing Sheets

NON-STRINKING SILOXANE POLYMERS

This invention was made with Government support under Contract No. DE-AC04-94AL85000 awarded by the Department of Energy. The Government has certain rights in the invention.

BACKGROUND OF THE INVENTION

The invention relates to highly-crosslinked polysiloxane gels made from non-shrinking siloxane materials and a process for making the same. More particularly, this invention relates to a new class of disilaoxacyclopentane monomers that do not shrink substantially when undergoing a ring-opening polymerization to form highly-crosslinked polysiloxane gels useful as encapsulants.

In the general sol-gel chemistry of alkoxysilanes to form highly-cross-linked polysiloxane gels, stoichiometric quantities of water are used as part of a step-growth polymerization process and solvents are used for monomer/water miscibility. Subsequent evaporation of the solvent results in fragile gels as well as shrinkage of up to 90%. The drying process itself must be carried out slowly to avoid cracking of the gel. Much of the shrinkage results from the evaporation of the solvent used in the process and from by-products of the polymerization reaction itself. For example, Gloffelter et al. (U.S. Pat. No. 5,120,811, issued on Jun. 9, 1992) describe a sol-gel process for producing a polymer/glass hybrid coating that encounters significant changes in volume of up to 8:1 during the drying stage. Likewise, Haruvy et al. (U.S. Pat. No. 5,272,240, issued on Dec. 21, 1993), in another method for the sol-gel preparation of glasses, note that sol-gel polymerization reactions commonly result in cracking and fragmentation due to the extensive volume-contraction which accompanies the condensation reaction and the corresponding expulsion of the solvent and the condensation products. Haruvy et al. address this problem in part by choice of monomer and choice of reaction conditions as the hydrolysis reaction proceeds. By-products are still produced and water and optional solvent are still added during the hydrolysis reaction step. Curing at room temperature takes from hours to days.

One method for reducing shrinkage is to eliminate solvent and condensation by-products by replacing the step growth polymerization with a chain growth polymerization such as ring opening polymerization (ROP). Sadhir et al. (Sadhir, R. K. and Luck, R. M., "Expanding Monomers: Synthesis, Characterization and Applications," 1992, CRC Press, pp. 21–37) has shown that ROP is an effective means for reducing or, as with the polymerization of spiroorthocarbonates, completely eliminating, shrinkage in linear, hydrocarbon polymers. Suryanarayanan et al. (Suryanarayan, B., Peace, B. and Mayhan, K., J. Polym Sci.; Chem. Ed., 1974, 12, 1089) and Samara et al. (Samara, M. and Loy, D., Polym. Preprints, 1998, 39(1), 599) have shown that the simple monomer 2,2,5,5-tetramethyl-2,5-disilaoxacyclopentane can form a polymer under ROP in the presence of tetrabutylammonium hydroxide with shrinkage of less than 5%.

Useful would be highly-crosslinked gels that exhibit essentially no shrinkage and whose synthesis results in no condensation by-products. Loy et al. (Loy, D. A., Rahimian, K. and Samara, M., Angew. Chem., Int. Ed., 1999, 38, 555; incorporated herein by reference), Rahimian and Loy (Rahimian, K. and Loy, D., Polymer Preprints, 216th National Meeting of the American Chemical Society, Boston, Mass. 1998; incorporated herein by reference), and Rahimian and Loy (Rahimian, K. and Loy, D., Polymer Preprints, 217th National Meeting of the American Chemical Society, Anaheim, Calif. 1999; incorporated herein by reference) discuss novel monomers useful in preparing highly-crosslinked gels that exhibit little or no shrinkage during a ring opening polymerization process. The crosslinked gels produced have no porosity or surface area and can be used as encapsulants as well as coatings. The process used involves no solvents or water addition.

SUMMARY OF THE INVENTION

According to the present invention, a cross-linked polymer is provided containing recurring units of the general formula $R^1(Me_2SiOCH_2CHSiMe_2)_2$ wherein $R^1$ is an alkyl group containing at least two carbon atoms and Me represents a methyl group of the formula $CH_3$. The polymer has less than approximately 1% porosity and is thermally stable at temperatures up to approximately 500° C. In the process for making this polymer, a precursor monomer of the general formula $R[CH_2CH(Si(Me)_2)_2O]_2$, wherein R is a phenyl group or an alkyl group having at least two carbon atoms, is converted in the presence of an anionic base to form the cross-linked polymer. The anionic base can be, for example, tetrabutylammonium hydroxide, sodium hydroxide or potassium hydroxide and is present in a quantity of less than approximately 1 mole %. The conversion to the cross-linked polymer occurs by ring opening polymerization and results in shrinkage of less than approximately 5% by volume.

Also provided is a cross-linked polymer containing recurring units of the general formula $R(Me_2SiOCH_2CHSiMe_2)_2$ $[CH_2CHR^2(SiMe_2)_2O]_n$, wherein $R^2$ is hydrogen, phenyl, ethyl, propyl or butyl and n is sufficient to solvate the monomer. In the process for making this polymer, a precursor monomer $R[CH_2CH(Si(Me)_2)_2O]_2$ is admixed with a co-monomer $CH_2CHR^2(SiMe_2)_2O$ in the presence of an anionic base to form a cross-linked polymer of the general formula $R(Me_2SiOCH_2CHSiMe_2)_2$ $[CH_2CHR^2(SiMe_2)_2O]_n$. The polymer is formed within approximately one minute and results in shrinkage compared with the reactants of less than approximately 5 percent by volume.

The precursor monomer used in the process of making the cross-linked polymers is a compound bearing at least two 2,2,5,5-tetramethyl-2,5-disila-1-oxacylcopentane groups of the general formula $R[CH_2CH(Si(Me)_2)_2O]_2$, wherein R is a phenyl group or an alkyl group having at least two carbon atoms. The precursor monomer is made by admixing a diacetylene compound of the general formula $R(CCH)_2$ with $(CH_3)_4Si_2(O(CH_3))_2$ and a catalyst to form a mixture that is refluxed and then solubilized in an aqueous acid solution and non-reacting solvent to form a subsequent mixture. This mixture is catalytically hydrogenated to synthesize the monomer $R[CH_2CH(Si(Me)_2)_2O]_2$.

DESCRIPTION OF SPECIFIC EMBODIMENTS

Figure 1:
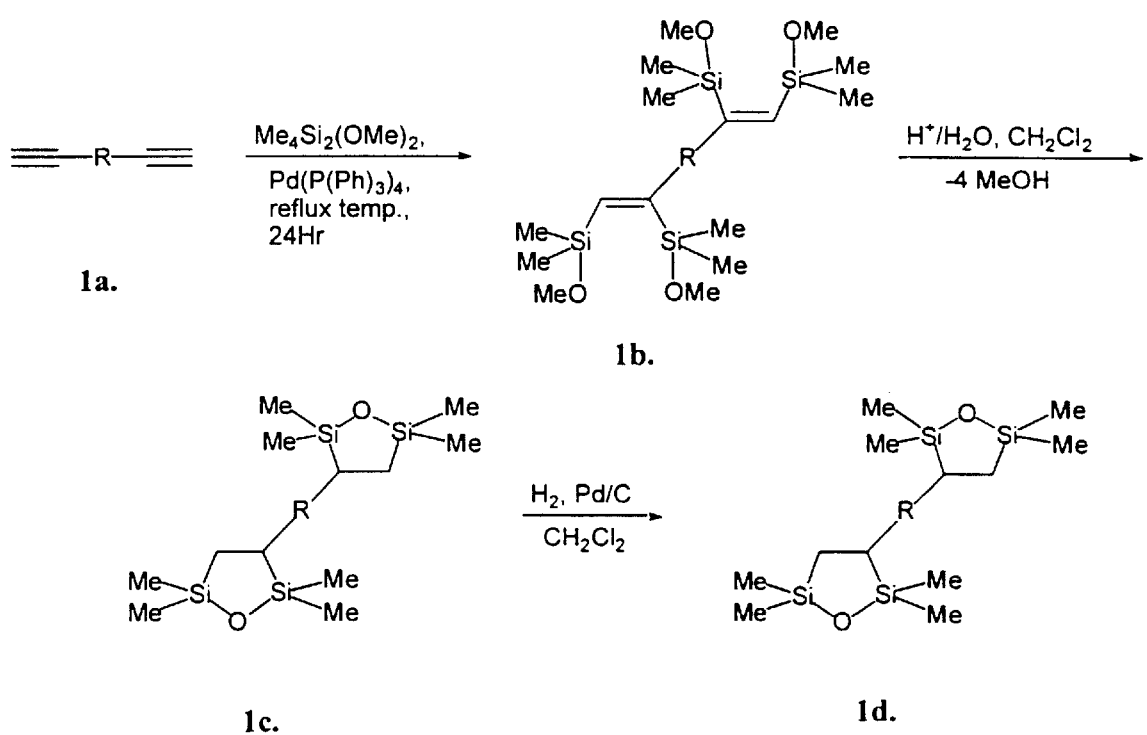
FIG. 1 shows the general reaction to produce the monomer of the general formula I.

According to the present invention, highly-crosslinked polysiloxane gels are prepared with no condensation by-products and with little or no volume loss during preparation. Application of previous sol-gel systems has generally been limited by the shrinkage, or volume-loss, associated with the evaporation of the solvent needed for monomer/water miscibility and the resulting condensation products formed during polymerization. According to the present invention, the step-growth polymerization step generally used in the sol-gel processing of alkoxysilanes with a chain-growth polymerization method is replaced with a ring opening polymerization (ROP) process, effectively eliminating shrinkage.

A new class of sol-gel processed, hybrid organic-inorganic materials has been prepared based on the ROP of novel arylene- and alkylene-bridged disilaoxacyclopentane monomers and more particularly novel arylene- and alkylene-bridged monomers bearing at least two 2,2,5,5-tetramethyl-2,5-disila-1-oxacyclopentane groups. When these novel precursor monomers, or more simply monomers, are liquids, they can be directly converted by ROP in the presence of catalytic quantities of an anionic base to a highly-crosslinked polysiloxane gel with little or no shrinkage. When these monomers are solids, they can be converted by ROP in the presence of a liquid disilaoxacyclopentane co-monomer and catalytic quantities of an anionic base to the highly-crosslinked gel with little to no shrinkage. This co-polymerization process using the liquid disilaoxacyclopentane co-monomer and catalytic quantities of an anionic base can also be used if the monomers are liquids to yield a different gel structure with potentially different properties. Whether the monomer is a liquid or solid, the opening of the disilaoxacyclopentane rings of the monomer precursors was confirmed by an upfield shift in the $^{29}$Si NMR spectrum, consistent with the release of ring strain in the five-membered ring with ROP.

These gels have uses in applications related to coatings, net-shape casting and particularly encapsulation, wherein the gel can be used to encapsulate and protect electronic components, such as microelectronic chips.

According to the process of the present invention, a highly-crosslinked polysiloxane gel is provided by ROP of a monomer bearing at least two 2,2,5,5-tetramethyl-2,5-disila-1-oxacylcopentane groups in the presence of catalytic quantities of an anionic base, such as tetrabutylammonium hydroxide (TBAH), sodium hydroxide (NaOH) or potassium hydroxide (KOH). These novel precursor monomers are arylene- and alkylene-bridged disilaoxacyclopentanes of the general formula I:

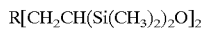

R[CH$_2$CH(Si(CH$_3$)$_2$)$_2$O]$_2$      (I)

with a structure

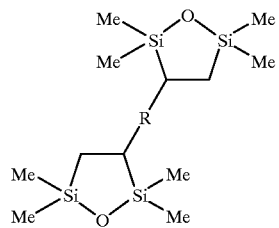

where Me is the methyl group CH$_3$ and R is a phenyl group or an alkyl group having at least two carbon atoms, and more particularly from 2 to 5 carbon atoms. Importantly, no solvent is used and no condensation by-products are formed.

An important feature is that little (less than approximately 5% by volume) or no shrinkage results.

These novel precursor monomers are prepared in a multi-step process from a diacetylene compound of the general formula II:

R(CCH)$_2$      (II)

One embodiment to produce these monomers is the reaction sequence shown in FIG. 1. In the first step of the process of producing these monomers, the diacetylene compound is reacted in the presence of Me$_4$Si$_2$(OMe)$_2$ and a catalyst, such as Pd(P(C$_6$H$_5$)$_3$). Watanabe et al. (Watanabe, H., Kobayashi, M, Saito, M. and Nagai, Y., J. of Organometallic Chemistry, 1981, 216, 149–157) have shown that an acetylene compound, but not a diacetylene compound, can be reacted with Me$_4$Si$_2$(OMe)$_2$ in the presence of a palladium catalyst to give a non-bridged disilane compound. The mixture is refluxed for several hours. For example, if R is the phenyl group, the reflux temperature is approximately 110° C. The resulting bridged, disilane compound undergoes a mild, acid-catalyzed condensation reaction in the presence of a non-reacting solvent, such as CH$_2$Cl$_2$, to achieve ring closure and provide two unsaturated five-membered rings without threat of polymerization. Attempts to polymerize these unsaturated compounds through ROP in the presence of various anionic catalysts and reaction conditions were unsuccessful. Importantly, catalyzed hydrogenation, preferably in the presence of a palladium catalyst and a non-reacting solvent, such as CH$_2$Cl$_2$, must occur to yield the novel monomers of the present invention in quantitative yields.

In one embodiment, when R is an alkyl group having from 2 to 5 carbon atoms, the precursor monomer is a liquid and is directly converted by ROP to the cross-linked gel in the presence of catalytic quantities (less than approximately 1 mole %) of an anionic base, such as tetrabutylammonium hydroxide (TBAH), sodium hydroxide or potassium hydroxide. Importantly, no solvent is used, no condensation by-products are formed, and little or no shrinkage occurs in this homopolymerization process. A highly cross-linked gel is produced in approximately one minute with recurring units of the following general formula III:

Figure 2:
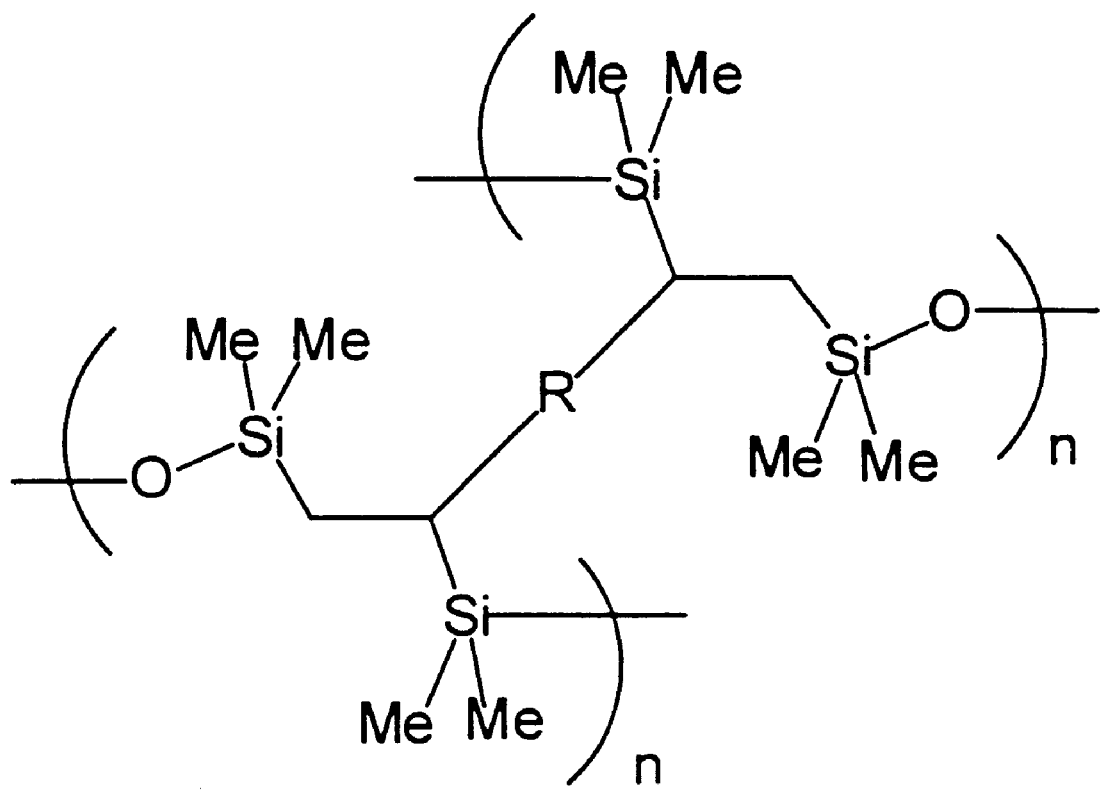
FIG. 2 shows the cross-linked polymer gel structure produced from the monomer of the general formula I where $R^1$ is an alkyl group.

R$^1$(Me$_2$SiOCH$_2$CHSiMe$_2$)$_2$      (III)

where R$^1$ is an alkyl group having from 2 to 5 carbon atoms, with the structure of the resulting gel shown in FIG. 2.

In another embodiment, the monomer of the general formula I is converted by ROP to a cross-linked gel in the presence of the anionic base and n moles of a co-monomer of the general formula IV:

Figure 3:
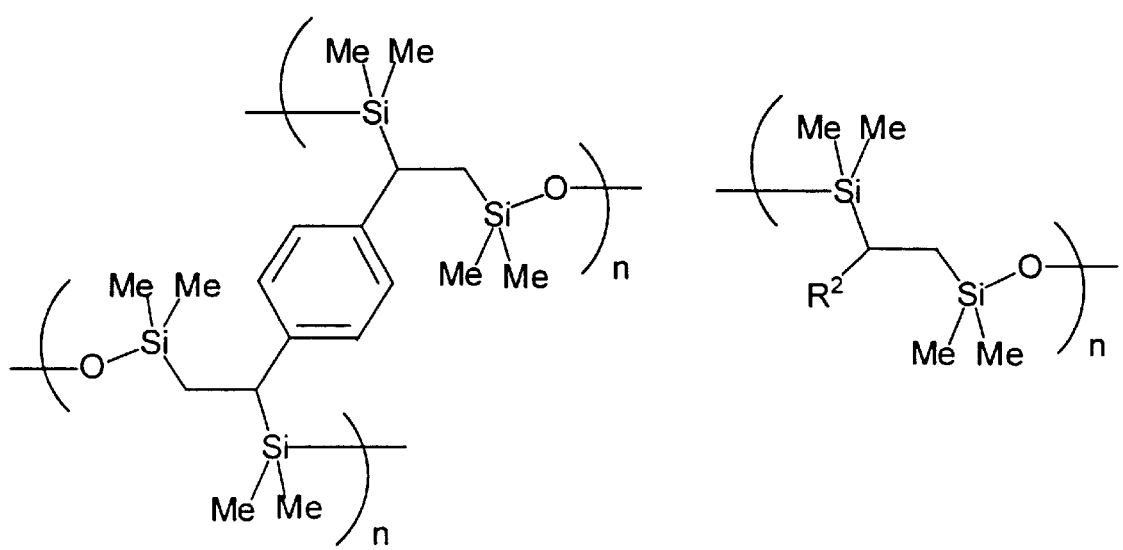
FIG. 3 shows the cross-linked polymer gel structure produced from the phenylene monomer and the co-monomer of the general formula IV.

CH$_2$CHR$^2$(SiMe$_2$)$_2$O      (IV)

of the structure:

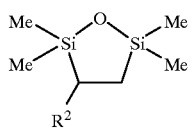

where R$^2$ is independently phenyl, hydrogen, ethyl, propyl or butyl. If R in the monomer of the general formula I is the phenyl group, the monomer is a solid and the co-monomer of the general formula IV must be in sufficient proportions to solvate or solubilize the monomer. If R is selected such that the monomer of the general formula I is a liquid, then the co-monomer is optional. The anionic base can be TBAH, sodium hydroxide or potassium hydroxide in quantities of less than approximately 1 mole %. Importantly, no other solvent is used, no condensation by-products are formed, and little or no shrinkage occurs. A highly cross-linked gel is produced within approximately one minute comprising recurring units represented by the following general formula V:

$$R(Me_2SiOCH_2CHSiMe_2)_2[CH_2CHR^2(SiMe_2)_2O]_n \qquad (V)$$

where n is sufficient to solvate the monomer. When R is the phenyl group, n>6.5. When R is an alkyl group such that the monomer is a liquid, the co-monomer is not necessary to solvate the monomer and thus n>0. The value of n can be any value greater than that necessary to solvate the monomer subject to the limitation that a cross-linked gel is still formed. If n is infinitely high, then essentially no cross-linking can occur and a linear polymer system is formed. An example of the structure of the resulting gel where R is the phenyl group is shown in FIG. 3.

The presence of the co-monomer of the general formula IV is important in achieving a highly-cross-linked gel without shrinkage when the monomer of the general formula I is a solid. For example, when the monomer of the general formula I has R as the phenyl group and was reacted without the co-monomer of the general formula IV in the presence of the anionic base TBAH in a 1.0M tetrahydrofuran solvent by ROP, a gel was produced but the resulting gel was brittle and occurred with a volume loss of approximately 85%. When the monomer of the general formula I is a solid, the co-monomer serves not only as a solvent but uniquely allows the highly-crosslinked gel to be formed with essentially no shrinkage. The co-monomer of the general formula IV can also be used when the monomer of the general formula I has R as an alkyl group and is a liquid.

By using the co-monomer of the general formula IV as both a solvent and a reactive diluent in the polymerization, the solvent is converted into part of the network polymer and shrinkage is reduced. In one embodiment, the exothermic polymerization of a mixture of $(CH_2)_2(Si(CH_3)_2)_2O$ and the phenylene monomer (80:20 by weight) with TBAH (0.2 mol % based on the co-monomer) gave rise to transparent, crack-free gel within seconds of mixing. Higher catalyst concentration (1 mol % based on the co-monomer) leads to generation of more heat during polymerization, causing bubbles to form (presumably due to monomer volatilization) and become entrapped within the gel. Solid state $^{13}C$ and $^{29}Si$ NMR revealed a polymer composition representative of the starting phenylene monomer/co-monomer ratio (80:20 by weight) and no detectable unreacted monomer in the final gel. Similarly, a highly-crosslinked gel was made using a starting phenylene monomer/co-monomer ratio of 90:10 by weight.

Figure 4:
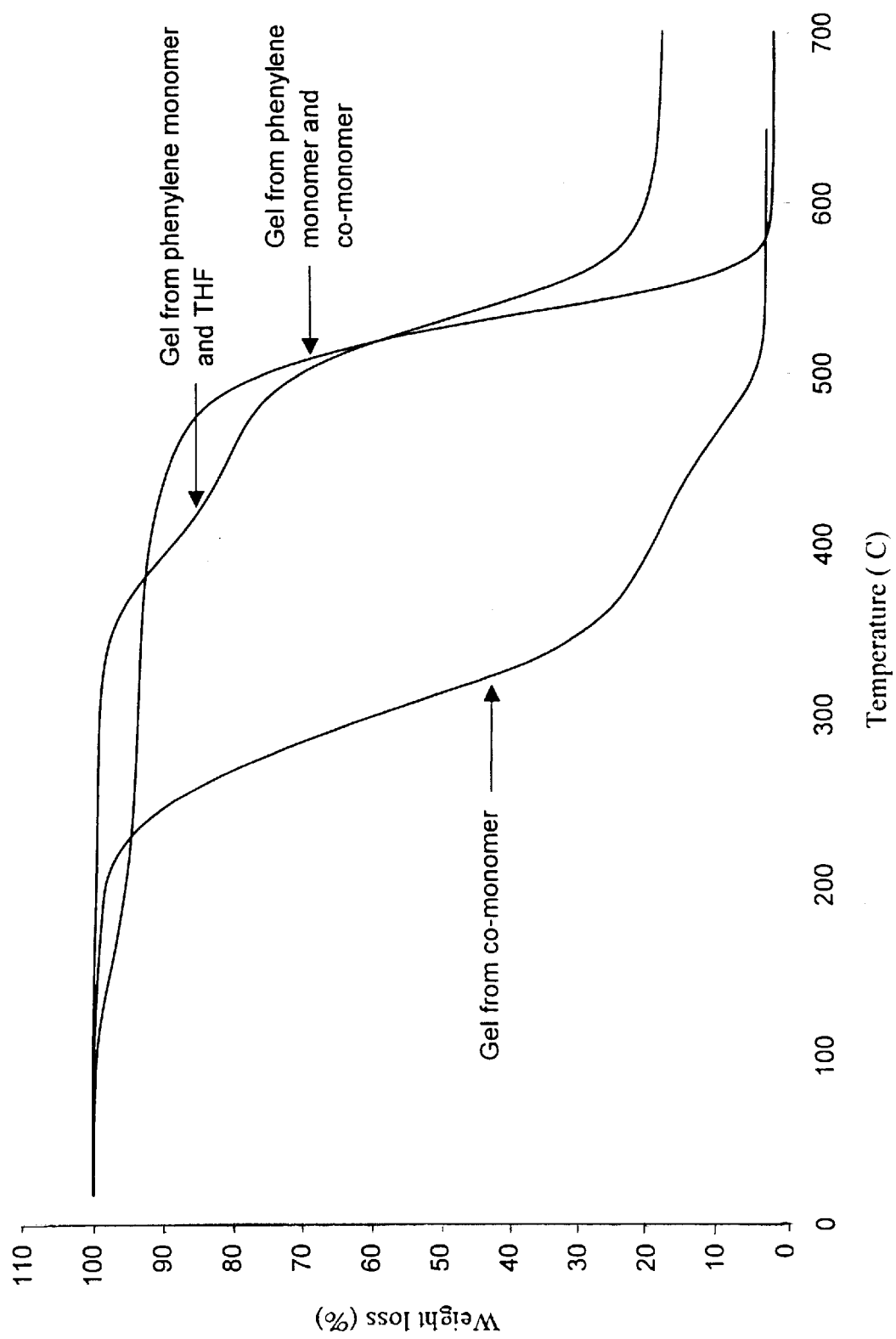
FIG. 4. Shows the thermal gravimetric analysis of the polymer gels.

Thermal gravimetric analysis was performed on the gel material made from the phenylene monomer (general formula I with R being the phenyl group) using the tetrahydrofuran solvent and also the cross-linked gel materials resulting from co-polymerization of the phenylene monomer with its co-monomer (general formula IV with $R^2$ being hydrogen) without solvent (see FIG. 4). This is compared in FIG. 4 to the homopolymerization product of the co-monomer alone, which began to degrade at 250° C. and was completely depolymerized by 500° C. In contrast, the homopolymerization of the phenylene monomer alone began to decompose at 375° C. and left a ceramic residue (17.1%). The co-polymer formed by reaction of the monomer with the co-monomer showed an initial weight loss of about 4% followed by complete degradation starting at 500° C. Using the method of the present invention with both the phenylene monomer and the co-monomer increased the thermal stability by over 150° C.

According to the present invention, highly-crosslinked polysiloxane gels are provided comprising recurring units represented by the general formulae III and V where R is a phenyl group or an alkyl group, preferably having from 2 to 5 carbon atoms. These gels are insoluble materials with a volume loss of less than approximately 5% shrinkage compared with the volume of the reactants. Nitrogen sorption porosimetry and scanning electron microscopy of the gels revealed no significant micro-and mesoporosity (less than 1%); surface area was also approximately zero (<0.1 m²/g).

A microelectronic test chip was successfully encapsulated with the ROP of the 80/20 mixture of the phenylene monomer of the general formula I and the co-monomer $C_2H_2(Si(CH_3)_2)_2O$ according to the present invention. The resulting cross-linked polysiloxane gel formed quickly around the test chip as a transparent, slightly yellow resin with only few bubbles forming due to the heat of polymerization. No visible cracks or shrinkage of the encapsulant were observed.

EXAMPLES

The diacetylene compounds, such as diethynylbenzene, were purchased from TCI America and used as received. All other reagents and solvents were purchased from Aldrich Chemical Co., ACROS Chemicals, or Strem Chemicals and used as received. All reactions and distillations were performed under an argon atmosphere unless stated otherwise. Solution nuclear magnetic resonance (NMR) spectra were performed on a Bruker DRX400 spectrometer ($^1H$, 400.16 MHz; $^{13}C$ 100.04 MHz; $^{29}Si$, 80.03 MHz) and were referenced against residual solvent peaks or external TMS. Solid state $^{13}C$ and $^{29}Si$ CP MAS NMR spectra were obtained with a Bruker AMX400 MHz spectrometer at 100.63 MHz and 79.5 MHz, respectively, and were acquired with magic angle spinning (MAS) speeds of approximately 5 kHz and 3–5 kHz, respectively. $^{13}C$ NMR spectra were acquired using cross polarization (CP) with a relaxation delay of 1 sec and a cross polarization time of 2 msec. $^{13}C$ referencing was performed on the carbonyl resonance of solid glycine ($\partial$=176.0). $^{29}Si$ NMR spectra were acquired using single pulse excitation with a relaxation delay of 480 sec. $^{29}Si$ CP MAS NMR spectra were deconvoluted using a Lorentz-Gaussian (50:50) fit. Mass spectra were obtained on a Fisons Autospec (CI, ammonia). Monomer purity was determined either by solution NMR spectroscopy or by gas chromatography (GC) with an HP Series II 5890 and a packed column with HP-1 (crosslinked methyl siloxane), 15m×0.32 mm. Infrared (IR) spectra were obtained on a Perkin-Elmer 1750 Fourier Transform Infrared spectrophotometer. Thermal graviometric studies were performed on a Perkin Elmer TGA7 using $N_2$ as the carrier gas and a sample heating rate of 10° C./min. Low resolution mass spectroscopy (LRMS) measurements were made using a Hewlett Packard GC-MS spectrometer equipped with a 5972 Series Mass Selective Detector and 5890 Series II GC.

Example 1

Synthesis of $C_6H_4(Me_2SiOCH_2CHSiMe_2)_2$ $[CH_2CHR^2(SiMe_2)_2O]_n$

The polymer gel $C_6H_4(Me_2SiOCH_2CHSiMe_2)_2$ $[CH_2CHR^2(SiMe_2)_2O]_n$ was synthesized according to the process of the present invention. The monomer $C_6H_4[C_2H(Si(CH_3)_2)_2O]_2$ was first synthesized according to the reaction scheme shown in FIG. 1. A solution of diethynylbenzene (5.00 g, 0.040 mol), $Me_4Si_2(OMe)_2$ (21.00 g, 0.12 mol) and $(Ph_3P)_4Pd$ (0.46 g, $3.98\times10^{-4}$ mol) in toluene (50 mL) was heated (refluxed) at 110° C. for 12 hours. The volatiles were distilled at ambient pressure to leave a black solid residue. The product was sublimed under vacuum (100° C., 0.01 Torr) to give a white solid B (see FIG. 1b for structure where R is a phenyl group), m.p. =137° C. (16.4 g, 85% yield). The IR for this white solid was: 2955.3, 1489.2, 1252.2, 931.5, 826.2, 637.2 $cm^{-1}$.

To a solution of this white solid B of the structure shown in FIG. 1b where R is a phenyl group (6.00 g, 0.012 mol) in $CH_2Cl_2$ (50 mL) was added 0.62 mL of 0.1 N aqueous HCl solution. The mixture was stirred for 2 hours at room temperature, after which the volatiles were removed in vacuo (R.T., 0.01 Torr). The product was then redissolved in $CH_2Cl_2$ (50 mL) and stirred over activated 4A molecular sieves overnight. The sieves were then filtered and the volatiles were removed to leave an analytically pure white solid compound C of the structure shown in FIG. 1c, where R is the phenyl group, m.p.=148° C. (4.68 g, 100% yield). IR for this solid: 2955.1, 1489.0, 1251.9, 931.8, 826.3, 786.7, 637.2 $cm^{-1}$. NMR for this solid: $^1H$ (400.1 MHz, $C_6D_6$), $\partial$=7.47 (s, 4H), 7.20 (s, 2H), 0.41 (s, 12H), 0.28 (s, 12H); $^{13}C$ (100.05 MHz, $C_6D_6$), $\partial$=164.6, 144.7, 140.3, 127.1, 1.5, 1.0; $^{29}Si$ (80.5 MHz, $C_6D_6$), $\partial$=15.2, 13.7. LRMS (Cl methane): m/z=391 $[M+H]^+$, 375 $[M-O]^+$.

To synthesize the phenylene monomer of the general formula I, a solution of C (5.00 g, 0.0128 mol) in $CH_2Cl_2$ was placed under an atmosphere of $H_2$ (40 psi) with Pd/C (10% Pd content, 1.0 mol %) and stirred for 48 hours. The insolubles were filtered through celite and the volatiles were removed en vacuo (R.T., 0.01 Torr) to leave analytically pure monomer $C_6H_4[C_2H(Si(CH_3)_2)_2O]_2$ as a white solid, m.p. 112° C. (5.05 g, 100% yield). IR for $C_6H_4[C_2H(Si(CH_3)_2)_2O]_2$: 2957.8, 2912.8, 1654.8, 1506.5, 1420.2, 1254.4, 1144.4, 1030.9, 920.7, 854.4, 657.9, 623.4 $cm^{-1}$. NMR for $C_6H_4[C_2H(Si(CH_3)_2)_2O]_2$: $^1H$ (400.1 MHz, $C_6D_6$), $\partial$=7.10 (s, 4H), 2.48 (t, 2H), 1.16 (d, 4H), 0.26 (s, 6H), 0.25 (s, 6H), 0.14 (s, 6H), −0.09 (s, 6H); $^{13}C$ (100.05 MHz, $C_6D_6$), $\partial$=140.6, 126.6, 32.8, 17.0, 0.9, 0.4, −0.3, −2.5; $^{29}Si$ (80.5 MHz, $C_6D_6$), $\partial$=21.9, 20.9. LRMS (Cl methane): m/z=395 $[M+H]^+$, 379 $[M-O]^{30}$.

The crosslinked polymer gel was synthesized using the produced phenylene monomer and the co-monomer of the general formula IV where $R^2$ is hydrogen. An 80:20 ratio of the co-monomer/monomer was made (by weight, 1.00 g total; alternatively 0.51 mmol of the monomer to 4.99 mmol of the co-monomer) solution and TBAH (10 µL of 1 M solution in methanol/toluene, 0.20 mol % based on the co-monomer was added with vigorous stirring. Within 30 seconds, the solution solidified into a nonflowing gel. $^{13}C$ CPMAS NMR: $\partial$=140.1, 127.9, 31.7, 17.4, 9.9, −0.1. $^{29}Si$ CPMAS NMR: $\partial$=8.6, 5.3. TGA showed one weight loss transition at 500° C. (98%). Elemental analysis calculated for polymer: C 46.90%, H 9.78%, Si 33.72%, found: C 46.21%, H 10.37%, Si 30.06%. Less than approximately 4% by volume shrinkage occurred.

When R is the phenyl group in the bridged co-monomer of the general formula IV, a maximum weight of 25% (13.5 mol %) of the phenyl bridged monomer can be used in making the copolymer, with the remainder being the co-monomer. When R is an alkyl group in the bridged co-monomer, the maximum weight can be 100% (100 mol %) of the alkyl-bridged monomer since the bridged co-monomer is a liquid.

Example 2

Synthesis of $R^1(Me_2SiOCH_2CHSiMe_2)_2$ With $R^1$ Being an Alkyl Group

To 5.00 mmol of the monomer $R[CH_2CH(Si(CH_3)_2)_2O]_2$, where R was an ethyl, propyl, or butyl group, TBAH (10 µL, 0.20 mol % of 1M solution in methanol/toluene) was added with vigorous stirring and a gel of the general formula $R^1(Me_2SiOCH_2CHSiMe_2)_2$ developed within one minute by ROP.

Example 3

Synthesis of $R(Me_2SiOCH_2CHSiMe_2)_2[CH_2CHR^2(SiMe_2)_2O]_n$

Cross-linked gels were synthesized using the monomer of the general formula I where R was an alkyl group, and more specifically, in one example an ethyl group and in another example a butyl group, and the co-monomer of the general formula IV where $R^2$ was a hydrogen group. To 0.20 g (0.58 mmol) of the monomer with R= the ethyl group was added 0.8 g (4.99 mmol) of the co-monomer, and TBAH as a 10 µL of 1 M solution in methanol/toluene, (0.20 mol % based on the co-monomer) with vigorous stirring. A cross-linked gel was formed within a minute.

Example 4

Synthesis of $C_6H_4(Me_2SiOCH_2CHSiMe_2)_2[CH_2CHR^2(SiMe_2)_2O]_n$

Cross-linked gels with recurring units of the formula $C_6H_4(Me_2SiOCH_2CHSiMe_2)_2$ $[CH_2CHR^2(SiMe_2)_2O]_n$ were synthesized where $R^2$ was in one instance an n-propyl group and in another instance the n-butyl group. In the synthesis, 0.80 g of the co-monomer (3.95 mmol for $R^2$=n-propyl and 3.70 mmol for $R^2$=n-butyl) was added with vigorous stirring to 0.20 g of the phenylene-bridged monomer (0.58 mmol)}, with 0.20 mol % TBAH based on the co-monomer (e.g., 7.9 µL where $R^2$=n-propyl and 7.4 µL for $R^2$=n-butyl, of 1M solution in methanol/toluene). The cross-linked gel developed within one minute.

The invention being thus described, it will be apparent to those skilled in the art that the same may be varied in many ways. Such variations are not to be regarded as a departure from the spirit and scope of the invention, and all such modifications are intended to be included within the scope of the following claims.

We claim:

1. A monomer composition bearing at least two 2,2,5,5-tetramethyl-2,5-disilaoxacyclopentane groups, comprising:
   a compound of the general formula $R(CH_2CH(Si(CH_3)_2)_2O)_2$, wherein R is a phenylene group or an alkylene group having at least two carbon atoms.

2. The monomer composition of claim 1 wherein the alkylene group has from 2 to 5 carbon atoms.

3. A cross-linked polymer, comprising:
   a compound containing recurring units of the general formula $R^1(Me_2SiOCH_2CHSiMe_2)_2$ wherein $R^1$ is an alkylene group containing at least two carbon atoms.

4. The cross-linked polymer of claim 3 wherein the alkylene group has from 2 to 5 carbon atoms.

5. The cross-linked polymer of claim 3 wherein the surface area is less than approximately 0.1 $m^2/g$.

6. The cross-linked polymer of claim 3 wherein the compound is thermally stable at temperatures up to approximately 500° C.

7. A cross-linked polymer, comprising:
   a compound containing recurring units of the general formula $R(Me_2SiOCH_2CHSiMe_2)_2(CH_2CHR^2(SiMe_2)_2O)_n$, wherein R is a phenylene group or an alkylene group having at least two carbon atoms, $R^2$ is hydrogen, phenyl, ethyl, propyl or butyl, n>6.5 when R is a phenylene group and n>0 when R is an alkylene group.

8. The cross-linked polymer of claim 7 wherein the surface area is less than approximately 0.1 $m^2/g$.

9. The cross-linked polymer of claim 7 wherein the compound is thermally stable at temperatures to approximately 500° C.

10. A process for making a cross-linked polymer, comprising:
    converting a precursor monomer of the general formula $R(CH_2CH(Si(CH_3)_2)_2O)_2$, wherein R is a phenylene group or an alkylene group having at least two carbon atoms, in the presence of an anionic base, to form a cross-linked polymer of recurring units of the general formula $R(Me_2SiOCH_2CHSiMe_2)_2$.

11. The process of claim 10 wherein the anionic base is selected from the group consisting of tetrabutylammonium hydroxide, sodium hydroxide or potassium hydroxide.

12. The process of claim 10 wherein the anionic base is present in a quantity of less than approximately 1 mole % based on $R(CH_2CH(Si(CH_3)_2)_2O)_2$.

13. The process of claim 10 wherein the conversion occurs by ring opening polymerization.

14. A process for making a cross-linked polymer, comprising:
    admixing $R(CH_2CH(Si(CH_3)_2)_2 O)_2$ and $CH_2CHR^2(SiMe_2)_2O$ wherein R is a phenylene group or an alkylene group having at least two carbon atoms and $R^2$ is phenyl, hydrogen, ethyl, propyl, or butyl in the presence of an anionic base, to form a cross-linked polymer of the general formula $R(Me_2SiOCH_2CHSiMe_2)_2 (CH_2CHR^2(SiMe_2)_2O)_n$, wherein n>6.5 when R is a phenylene group and n>0 when R is an alkylene group.

15. The process of claim 14 wherein the cross-linked polymer is formed within approximately one minute.

16. A process for making a monomer, comprising:
    admixing a diacetylene compound of the general formula $R(CCH)_2$ where R is a phenylene group or an alkylene group having at least 2 carbon atoms, with $(CH_3)_4Si_2(O(CH_3))_2$ and a catalyst to form a first mixture;
    refluxing said first mixture to form a second mixture;
    solubilizing said second mixture in an aqueous acid solution and non-reacting solvent to form a third mixture; and
    catalytically hydrogenating said third mixture to synthesize the monomer $R(CH_2CH(Si(CH_3)_2)_2O)_2$.

17. A product by the process of claim 10.

18. A product by the process of claim 14.

* * * * *

UNITED STATES PATENT AND TRADEMARK OFFICE
CERTIFICATE OF CORRECTION

PATENT NO. : 6,235,864 B1
DATED : May 22, 2001
INVENTOR(S) : Loy, Douglas A.; Rahimian, Kamyar Page 1 of 1

It is certified that error appears in the above-identified patent and that said Letters Patent is hereby corrected as shown below:

<u>Title page,</u>
Item [54], replace the title "Non-strinking siloxane polymers" with -- Non-shrinking siloxane polymers --

Signed and Sealed this

Twenty-second Day of January, 2002

Attest:

*Attesting Officer*

JAMES E. ROGAN
*Director of the United States Patent and Trademark Office*